(12) United States Patent
Shah et al.

(10) Patent No.: US 9,357,473 B2
(45) Date of Patent: May 31, 2016

(54) ADAPTIVE WIRELESS ACCESS POINT DISCOVERY

(71) Applicant: QUALCOMM Incorporated, San Diego, CA (US)

(72) Inventors: Jeemil N. Shah, San Diego, CA (US); Ashok Bhatia, San Diego, CA (US); Yuhua Hu, Sunnyvale, CA (US); Gengsheng Zhang, Cupertino, CA (US); Arie Rahmat, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 114 days.

(21) Appl. No.: 13/797,168

(22) Filed: Mar. 12, 2013

(65) Prior Publication Data

US 2014/0274039 A1     Sep. 18, 2014

(51) Int. Cl.
| | |
|---|---|
| *H04W 4/00* | (2009.01) |
| *H04W 48/16* | (2009.01) |
| *H04W 8/18* | (2009.01) |
| *H04W 84/12* | (2009.01) |

(52) U.S. Cl.
CPC .............. *H04W 48/16* (2013.01); *H04W 8/18* (2013.01); *H04W 84/12* (2013.01)

(58) Field of Classification Search
CPC ............ H04L 41/0681; H04L 41/0806; H04L 41/0873; H04W 48/16; H04W 84/12; H04W 8/18; H04W 48/08; Y10S 370/908
USPC ........................................................ 455/434
See application file for complete search history.

(56) References Cited

U.S. PATENT DOCUMENTS

| | | | |
|---|---|---|---|
| 7,466,678 B2 | 12/2008 | Cromer et al. | |
| 8,185,129 B2 | 5/2012 | Alizadeh-Shabdiz | |
| 2001/0041568 A1 | 11/2001 | Hughes et al. | |
| 2004/0214539 A1 | 10/2004 | Rajamani et al. | |
| 2005/0105501 A1* | 5/2005 | Oura | 370/338 |
| 2008/0008121 A1* | 1/2008 | Alizadeh-Shabdiz | 370/328 |
| 2008/0014934 A1* | 1/2008 | Balasubramanian et al. | 455/434 |
| 2008/0037490 A1* | 2/2008 | Hughes et al. | 370/338 |
| 2008/0198811 A1* | 8/2008 | Deshpande et al. | 370/332 |
| 2010/0061335 A1* | 3/2010 | Kannan | 370/331 |
| 2010/0195595 A1* | 8/2010 | Iwata | 370/329 |
| 2010/0267380 A2 | 10/2010 | Montemurro et al. | |
| 2011/0038357 A1 | 2/2011 | Gong | |
| 2012/0063340 A1 | 3/2012 | Waters et al. | |

(Continued)

FOREIGN PATENT DOCUMENTS

EP       1950987 A1     7/2008

OTHER PUBLICATIONS

International Search Report and Written Opinion—PCT/US2014/021379—ISA/EPO—Jun. 12, 2014, 15 pages.

(Continued)

*Primary Examiner* — Timothy Pham
(74) *Attorney, Agent, or Firm* — Hunter Clark PLLC (57) ABSTRACT

Disclosed are a system, apparatus, and method for adaptive discovery and scanning of wireless access points. In one embodiment, a set of channels can be scanned in a first iteration to discover wireless access points. In one embodiment, a discovery profile based on the discovered wireless access points can be determined and in a second iteration, a subset of the set of channels can be scanned. In one embodiment, the subset consists of non-overlapping channels selected according to the discovery profile.

17 Claims, 5 Drawing Sheets

(56) References Cited

U.S. PATENT DOCUMENTS

| | | |
|---|---|---|
| 2012/0127955 A1 | 5/2012 | Gandham et al. |
| 2013/0039181 A1 | 2/2013 | Chao |
| 2014/0286190 A1* | 9/2014 | Vallabhu et al. ............. 370/254 |
| 2015/0043366 A1* | 2/2015 | Kneckt ............... H04L 43/0852 370/252 |

OTHER PUBLICATIONS

International Preliminary Report on Patentability—PCT/US2014/021379, The International Bureau of WIPO—Geneva, Switzerland, May 26, 2015.

* cited by examiner

ADAPTIVE WIRELESS ACCESS POINT DISCOVERY

FIELD

The subject matter disclosed herein relates generally to wireless access point discovery and initialization.

BACKGROUND

WiFi may operate in distinct frequency ranges (e.g., 2.4 GHz, 3.6 GHz, and 4.9/5.0 GHz). Each range may be divided into a multitude of channels. Individual countries may regulate the allowable channels, allowed users, and maximum power levels within frequency ranges. However, regulations may not be consistent from country to country. Accordingly, spectrum assignments and operational limitations are not consistent worldwide. For example, the United States 2.4 GHz band may allow use of channels 1 through 11, while much of Europe allows for an additional two channels (e.g., channels 12, and 13) beyond those permitted in the United States. Japan further allows communication on channel 14.

A WiFi signal can occupy five channels in the 2.4 GHz band and the protocol can require 25 MHz of channel separation, with adjacent channels overlapping and possibly interfering with each other. Therefore spacing of at least 5 channels (or more) between each WiFi network is desirable to avoid interference. Channels 1, 6, and 11 are three non-overlapping channels in the United States and popular choices for use in WiFi stations. In other counties, other channels may be designated as non-overlapping channels. In parts of Europe and Japan for example, channels 1, 5, 9, and 13 may be designated as non-overlapping channels. In contrast, the 5 GHz range may have 23 non-overlapping channels.

To discover WiFi access points or stations traditionally requires scanning all channels (e.g., channels 1 through 13 or 14). Devices are typically agnostic to geographic location. Especially in the case of WiFi based positioning systems (WPS), discovery channel scans can occur frequently. Each WPS discovery scan uses power and CPU cycles, which may be detrimental to battery life for mobile devices.

Therefore, new and improved power and processing efficient channel scanning mechanisms are desirable.

SUMMARY

Embodiments disclosed herein may relate to a method to optimize wireless access point channel discovery. The method may include scanning a set of channels in a first scan iteration to discover one or more wireless access points and determining a discovery profile based on one or more discovered wireless access points. The method may further include scanning a subset of the set of channels in a second scan iteration, wherein the subset of the set of channels consists of non-overlapping channels selected according to the discovery profile.

Embodiments disclosed herein may also relate to a machine readable storage medium containing executable code for wireless access point discovery, which, when executed by a processor, may cause the processor to scan a set of channels in a first scan iteration to discover one or more wireless access points. The code may further determine a discovery profile based on one or more discovered wireless access points and scan a subset of the set of channels in a second scan iteration, wherein the subset of the set of channels consists of non-overlapping channels selected according to the discovery profile.

Embodiments disclosed herein may further relate to a data processing system including a processor and a storage device storing instructions for wireless access point discovery. The instructions may cause the processor to scan a set of channels in a first scan iteration to discover one or more wireless access points and determine a discovery profile based on one or more discovered wireless access points. The instructions may further cause the processor to scan a subset of the set of channels in a second scan iteration, wherein the subset of the set of channels consists of non-overlapping channels selected according to the discovery profile.

Embodiments disclosed herein may also relate to an apparatus for wireless access point discovery that may include means for scanning a set of channels in a first scan iteration to discover one or more wireless access points. The apparatus may further include means for determining a discovery profile based on one or more discovered wireless access points and means for scanning a subset of the set of channels in a second scan iteration, wherein the subset of the set of channels consists of non-overlapping channels selected according to the discovery profile.

Other features and advantages will be apparent from the accompanying drawings and from the detailed description.

BRIEF DESCRIPTION OF THE DRAWINGS

The accompanying drawings are presented to aid in the description of embodiments of the invention and are provided solely for illustration of the embodiments and not limitation thereof.

DESCRIPTION

Aspects of the invention are disclosed in the following description and related drawings directed to specific embodiments of the invention. Alternate embodiments may be devised without departing from the scope of the invention. Additionally, well-known elements of the invention may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Environment and Mobile Station Overview

Figure 1:
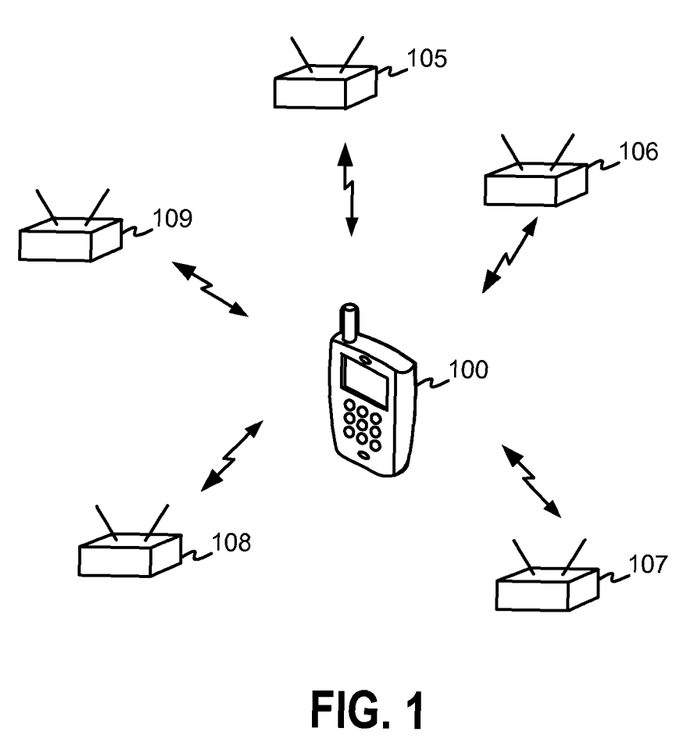
FIG. 1 is a diagram of an exemplary operating environment for a mobile station consistent with embodiments of the disclosure, in one embodiment.

FIG. 1 is a diagram of an exemplary operating environment for a mobile station (e.g., the mobile station 100). The mobile station may utilize the discovery techniques disclosed herein to determine the position of the mobile station and/or establish a data communication connection.

The operating environment of the mobile station may include Wireless Access Points (e.g., WAPs 105-109). The WAPs may be used by the mobile station for wireless voice and/or data communication, as well a source of position data. The WAPs can be part of a Wireless Network (e.g., Wireless Local Area Network, Wide Area Network, etc.), which may operate in buildings and perform communications over a relatively small geographic region compared to a Cellular or Wide Area Network. Such WAPs may be part of, for example, WiFi networks (802.11x).

In one embodiment, each WAP may be, for example, a WiFi wireless access point, which is not necessarily set in a fixed position and can change location. In one embodiment, the position of the mobile station may be determined by having the mobile station receive signals from each WAP. Each signal may be associated with its originating WAP based upon some form of identifying information that may be included in the received signal (such as, for example, a MAC address). The mobile station may then derive the time delays associated with each of the received signals.

Figure 2:
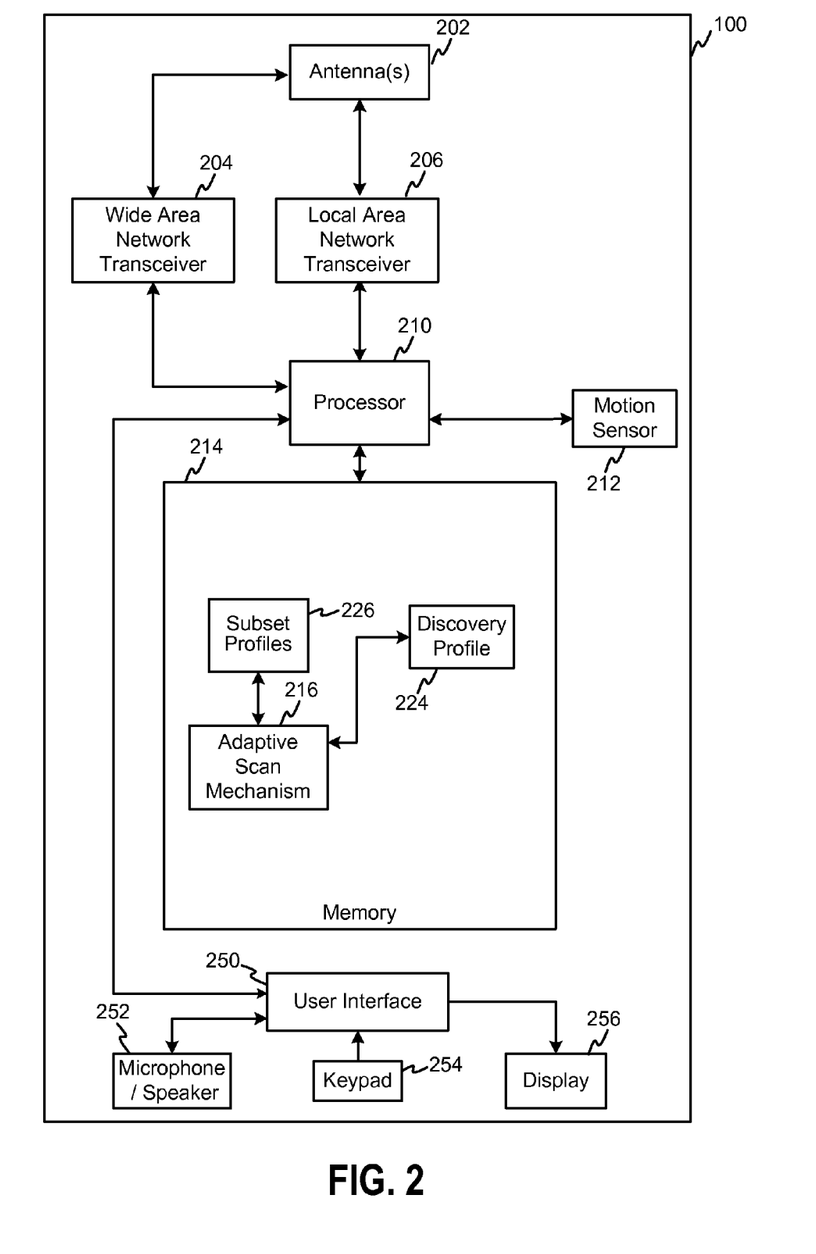
FIG. 2 is a block diagram illustrating various components of an exemplary mobile station, in one embodiment.

FIG. 2 is a block diagram illustrating various components of the exemplary mobile station 100, in one embodiment. For the sake of simplicity, the various features and functions illustrated in the box diagram of FIG. 2 are connected together using a common bus meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated may be further subdivided or combined.

The mobile station may include one or more local area network transceivers 206 connected to one or more antennas 202. The local area network transceiver 206 comprises suitable devices, hardware, and/or software for communicating with and/or detecting signals to/from WAPs, and/or directly with other wireless devices within a network. In one aspect, the local area network transceiver 206 may comprise a WiFi (802.11x) communication system suitable for communicating with one or more wireless access points.

The mobile station may also include one or more wide area network transceiver(s) 204 that may be connected to one or more antennas 202. The wide area network transceiver 204 comprises suitable devices, hardware, and/or software for communicating with and/or detecting signals to/from other wireless devices within a network. In one aspect, the wide area network transceiver 204 may comprise a CDMA communication system suitable for communicating with a CDMA network of wireless base stations; however in other aspects, the wireless communication system may comprise another type of cellular telephony network or femtocells, such as, for example, TDMA, LTE, WCDMA, UMTS, or GSM. Additionally, any other type of wireless networking technologies may be used, for example, WiMax (802.16), Ultra Wide Band, ZigBee, wireless USB, etc.

A motion sensor 212 may be coupled to processor 210 to provide relative movement and/or orientation information which is independent of motion data derived from signals received by the local area network transceiver 206. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, motion sensor 212 may include a plurality of different types of devices and combine their outputs in order to provide motion information.

A processor 210 may be connected to the local area network transceiver 206, and the motion sensor 212. The processor may include one or more microprocessors, microcontrollers, and/or digital signal processors that provide processing functions, as well as other calculation and control functionality. The processor 210 may also include memory 214 for storing data and software instructions for executing programmed functionality within the mobile station. The memory 214 may be on-board the processor 210 (e.g., within the same IC package), and/or the memory may be external memory to the processor and functionally coupled over a data bus. The details of software functionality associated with aspects of the disclosure will be discussed in more detail below.

A number of software modules or data tables may reside in memory 214 and be utilized by the processor 210 in order to manage both communications and positioning determination functionality. As illustrated in FIG. 2, memory 214 may include and/or otherwise receive subset profiles 226, discovery profiles 224, and the ASM 216. One should appreciate that the organization of the memory contents as shown in FIG. 2 is merely exemplary, and as such the functionality of the modules and/or data structures may be combined, separated, and/or be structured in different ways depending upon the implementation of the mobile station.

In one embodiment, an Adaptive Scan Mechanism (e.g., ASM 216) may be a process running on the processor 210 of the mobile station 100, which provides for enhanced WAP discovery scanning. The ASM may read or access Subset Profiles 226 and Discovery Profiles 224 as described in greater detail below. The ASM may be implemented in areas where precise indoor positioning is required, such as shopping malls, and offices. Shopping malls and offices may have well defined WiFi access configuration to provide a majority of access point communication over non-overlapping channels.

The mobile device may optionally store auxiliary position/motion data in memory that may be derived from information received from other sources as described below. Moreover, in other embodiments, supplemental information may include, but not be limited to, information that can be derived or based upon Bluetooth signals, beacons, RFID tags, and/or information derived from a map (e.g., receiving coordinates from a digital representation of a geographical map by, for example, a user interacting with a digital map).

While the modules or features shown in FIG. 2 are illustrated in the example as being contained in memory 214, it is recognized that in certain implementations such procedures may be provided for or otherwise operatively arranged using other or additional mechanisms. For example, all or part of ASM, Subset Profiles and/or Discovery Profile may be provided in firmware. Additionally, while in this example ASM, Subset Profiles, and/or Discovery Profile are illustrated as being separate features, it is recognized, for example, that such procedures may be combined together as one procedure or perhaps with other procedures, or otherwise further divided into a plurality of sub-procedures. The ASM, Subset Profiles, and Discovery Profiles may also be implemented as modules or engines in some embodiments.

Processor 210 may include any form of logic suitable for performing at least the techniques provided herein. For example, processor 210 may be operatively configurable based on instructions in memory 214 to selectively initiate one or more routines that exploit motion data for use in other portions of the mobile device.

The mobile station may include a user interface 250 to provide any suitable interface systems, such as a microphone/speaker 252, keypad 254, and display 256 that allows user interaction with the mobile station. The microphone/speaker 252 provides for voice communication services using the wide area network transceiver 204 and/or the local area network transceiver 206. The keypad 254 comprises any suitable buttons for user input. The display 256 comprises any suitable display, such as, for example, a backlit LCD display, and may further include a touch screen display for additional user input modes.

As used herein, the mobile station may be any portable, mobile, or movable device or machine that is configurable to acquire wireless signals transmitted from, and transmit wireless signals to, one or more wireless communication devices or networks. As shown in FIG. 1 and FIG. 2, the mobile station is representative of such a portable wireless device. Thus, by way of example but not limitation, the mobile station may include a radio device, a cellular telephone device, a computing device, a personal communication system (PCS) device, or other like movable wireless communication equipped device, appliance, or machine. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

The mobile station may communicate wirelessly with a plurality of WAPs using RF signals (e.g., 2.4 GHz, 3.6 GHz, and 4.9/5.0 GHz bands) and standardized protocols for the modulation of the RF signals and the exchanging of information packets (e.g., IEEE 802.11x). By extracting different types of information from the exchanged signals, and utilizing the layout of the network (i.e., the network geometry) the mobile station may determine position within a predefined reference coordinate system.

Adaptive Scan Mechanism Overview

Scanning all possible channels (e.g., 1-14) during every WAP discovery scan may waste power and CPU resources when access points are primarily on non-overlapping channels. When using WiFi discovery to aid in position and location determination (e.g., in a WiFi positioning system), a device may poll nearby access points repeatedly as location determination is tracked and updated. Furthermore, devices may regularly poll nearby access points to establish a network connection.

In one embodiment, an ASM can reduce the scan time for AP discovery, reduce overall device power consumption, and be implemented wherever access point discovery is used (e.g., positioning determination and establishing data connections). In one embodiment, the ASM can refer to one or more predetermined subset channels stored as Subset Profiles 226. The Subset Profiles specify non-overlapping channels for particular geographical locations. For example, in the United States 2.4 Ghz band, the non-overlapping channels may be 1, 6, 11 and stored as a U.S. Subset Profile. In some embodiments, the ASM can save the results of one or more initial discovery scans into a Discovery Profile. The Discovery Profile may contain a map, list, or other representation of currently discovered channels for comparison to the one or more predetermined non-overlapping channel maps (e.g., Subset Profiles). Upon detecting a compatible match between the Discovery Profile and a Subset Profile, the non-overlapping subset of channels described by the matching Subset Profile can be used to determine which channels to scan in subsequent (e.g., occurring at a later point in time) discovery scans.

Figure 3:
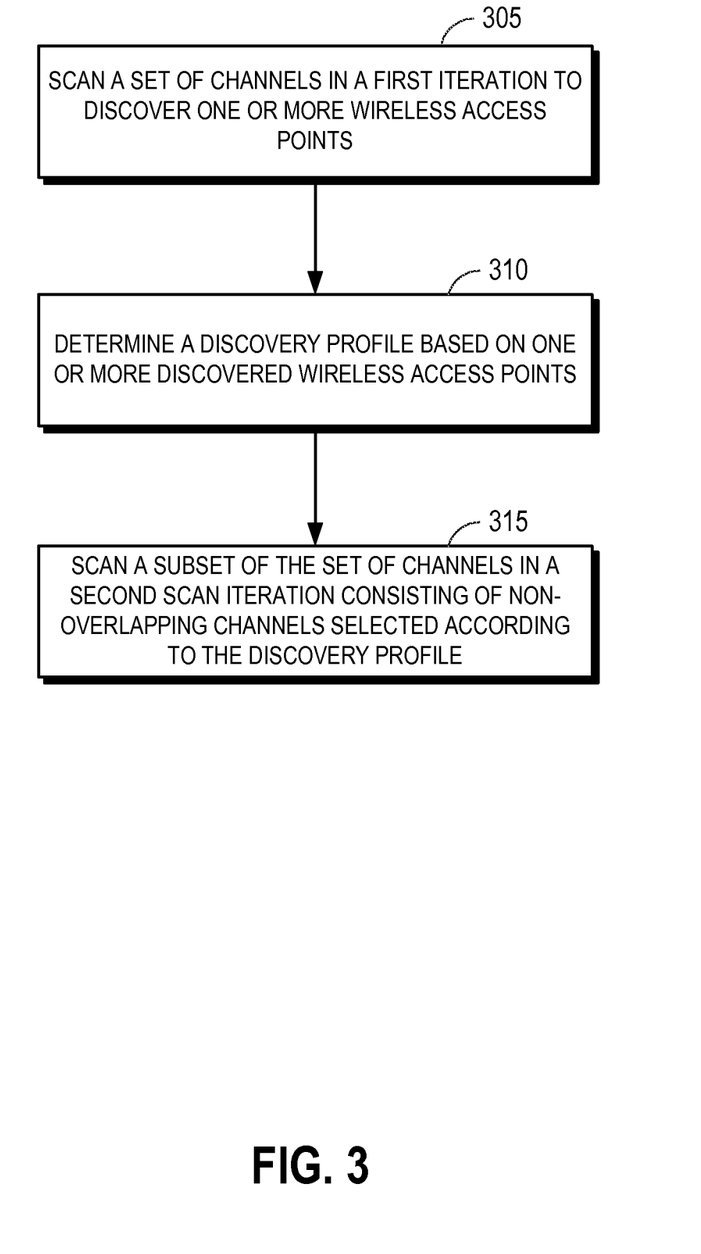
FIG. 3 illustrates a flow diagram of an Adaptive Scan Mechanism, in one embodiment.

FIG. 3 illustrates a flow diagram of the ASM, in one embodiment. At block 305, the ASM can scan (e.g., a passive or active WAP channel scan) a set of channels in a first scan iteration to discover one or more wireless access points. For example, the ASM may scan all possible channels (e.g., 1-14 for 2.4 Ghz band) to discover WAPs.

At block 310, the ASM can determine a Discovery Profile based on the one or more discovered channels or wireless access points from block 305. In one embodiment, the ASM stores results from the initial scan as a Discovery Profile. The Discovery Profile may contain a list or count of WAPs discovered as well as a detailed account of each discovered WAP broadcast channel. The Discovery Profile may also include information related to the WAP country of origin. In the United States 2.4 Ghz band, channels 1, 6, and 11 are non-overlapping channels. Other countries, such as Japan where 14 channels may be available, can have non-overlapping channels on 1, 5, 9, and 13. Persons of skill in the art will recognize that non-overlapping channels as used herein may apply to any country or frequency band and the exemplary embodiments for the 2.4 Ghz band are described merely for ease of discussion.

At block 315, the ASM can scan a subset of the channels in a second scan iteration, the subset of the set of channels consisting of non-overlapping channels selected according to the discovery profile. For example, instead of performing a scan on all available channels (e.g., channels 1-13/14 for the 2.4 Ghz band), the ASM can determine that a subset of channels are more likely to be used and limit future scans to the subset of channels.

Profiles

In one embodiment, the Discovery Profile is a grouping of current data associated with discovered WAPs. In some embodiments, a Discovery Profile includes a "sign" or indication of whether the results from an initial scan or series of initial scans are deterministic. For example, the Discovery Profile may be used to estimate whether the discovered channels can accurately predict/infer the types of nearby WAP channels.

In one embodiment, a Subset Profile is a predetermined subset (e.g., non-overlapping channels) of all possible discoverable WAP broadcast channels.

Figure 4:
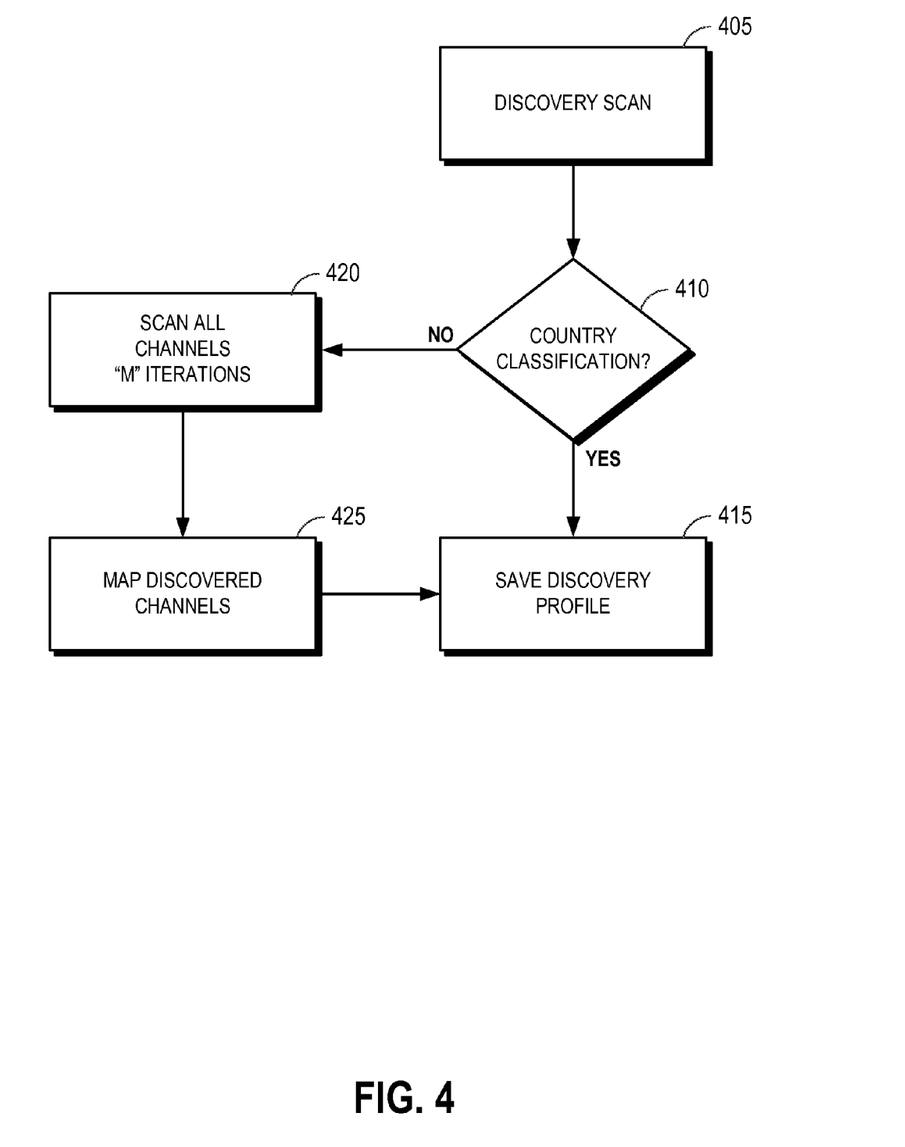
FIG. 4 illustrates a flow diagram of Discovery Profile generation, in one embodiment.

FIG. 4 illustrates one embodiment of Discovery Profile generation. At block 405, the ASM can perform an initial discovery scan. The initial scan may discover one or more WAPs and associated broadcast channels, as well as identify a beacon frame containing a country identifier or code.

At block 410, the ASM can attempt to determine a geographic location associated with the WAPs. In one embodiment, ASM can extract the country identifier available from the standard frames received from WAPs (e.g., the country identifier present in a beacon frame). If the ASM can positively identify a country classification from one or more of the WAPs, a representation of the geographic location can be saved to the Discovery Profile at block 415.

At block 420, the ASM may not have been able to determine a geographic location based on country identifier or other affirmative data. Therefore, the ASM can scan all channels (e.g., channels 1-13/14 for the 2.4 Ghz band) for "M" iterations at block 410. "M" may be any number of iterations determined to provide an adequate balance of performance and power efficiency.

At block 425, the ASM can use the discovered channels to create a channel map (e.g., for storage into the Discovery Profile) at block 425. In one embodiment, the ASM can match discovered channels (e.g., in a channel map of the Discovery Profile) to one or more Subset Profiles (e.g., predetermined subsets of non-overlapping channels), each Subset Profile associated with a geographical location. Depending on the number or percentage of channels that overlap or match a predetermined channel map (e.g., a Subset Profile) a country classification can be inferred. For example, if the channels discovered are 6, and 11, there may be a high likelihood that the WAPs are geographically located in the United States, where 1, 6, and 11 are non-overlapping channels used for many WAP installations. Alternatively, if the discovered channels are one or more of 5, 9, and 13, there may be a high likelihood that the WAPs and mobile station are in Japan. In cases where the discovered channels are non-deterministic (e.g., channels discovered do not infer a predictable pattern for future discovery), the Discovery Profile may be flagged or otherwise updated for later reference by the ASM. The ASM can read a flagged Discovery Profile and be alerted of the recommendation to continue scanning a superset of possible channels until a high confidence or deterministic Discovery Profile is created. In one embodiment, a Discovery Profile with high confidence indicators infers the Discovery Profile is likely to accurately infer the correct broadcast channels for future discovery scans. For example, if initially WAP discovery results in a channel map of 1, 6, and 11, (i.e. United States non-overlapping channels on 2.4 Ghz), the Discovery Profile, may be considered to have high confidence indicators. Alternatively, if the Discovery Profile contains overlapping channels and no country was determined, the Discovery Profile contains low confidence indicators.

In one embodiment, the Discovery Profile may contain geographic location information and/or channel mapping as described above. The ASM may use the location information and mapping information to determine whether future discovery scans can accurately be limited to a particular subset of non-overlapping channels. For example, a country identifier may be used to determine which subset of non-overlapping channels may be used based on the particular geographic location. For example, if the country identifier indicated by the Discovery Profile is associated with the United States, the subset of non-overlapping channels may be 1, 6, and 11. If the Discovery Profile indicates with a high likelihood that the mobile station is operating within the United States, subsequent discovery scans may be limited to channels 1-13 for full scans, and 1, 6, and 11 for non-overlapping (e.g., subset) scans. However, if the country identifier indicated by the Discovery Profile is associated with Japan, the subset of non-overlapping channels may be 1, 5, 9, and 13. Alternatively, a Discovery Profile that indicates a low country confidence or no high likelihood country classification may not limit subsequent scans to any subset of channels and perform discovery scans across all channels (e.g., channels 1 through 14 for 2.4 Ghz).

In one embodiment, the Discovery Profile may contain a channel map of discovered channels. The ASM can attempt to match the channel map from the Discovery Profile to one of a number of predetermined non-overlapping channel subsets (e.g., the Subset Profiles). If a Subset Profile matches the discovered channel map of the Discovery Profile, there may be a high confidence that the matching subset will provide for accurate channel discovery for subsequent scans. Subsequent scans may be limited to the subset of channels in the matching Subset Profile. For example, the Discovery Profile map may include discovered channels 6, and 11, which partially match with the non-overlapping U.S. subset of 1, 6, and 11 and provide a high confidence in the Discovery Profile. Alternatively, if multiple Subset Profiles match the discovered channel map, the likelihood of discovering WAPs in subsequent channel scans may be diminished. For example, if Discovery Profile map includes only channel 1, wherein channel 1 is part of the non-overlapping subsets of Europe, the United States, and Japan. In another example, if the Discovery Profile does not partially match any Subset Profile, there is a low confidence that the Discovery Profile can predict a subset of non-overlapping channels to use for subsequent discovery scans.

If no predetermined non-overlapping channel subset (e.g., Subset Profile) matches the currently discovered channel map, confidence in the Discovery Profile may be low, and the Discovery Profile may be flagged as currently non-deterministic. For example, if the Discovery Profile contains discovered channels 4, and 8, and channels 4 and 8 are overlapping channels in all profiled geographic locations, then the Discovery Profile may be considered non-deterministic or containing low confidence indicators.

In one embodiment, a Discovery Profile with a country identifier may provide the ASM with a higher confidence than a Discovery Profile without a country identifier. For example, receiving a positive confirmation of a specific geographic location may narrow the possible non-overlapping channels to one Subset Profile. Once the possible non-overlapping channels are known, the ASM can then determine whether nearby WAPs are broadcasting primarily on the non-overlapping channels.

In some embodiments the ASM may shift to scanning a subset of non-overlapping channels for a specified duration and then switch back to scanning all channels. This is to recognize the case where a high confidence in a subset of channels may be temporary as the mobile station may be moving and changing location to a different WAP environment. If the new WAP environment happens to generate the same Discovery Profile, the ASM can continue with scanning just the non-overlapping subset of channels. Otherwise, if the Discovery Profile changed, the ASM may have to revisit the confidence calculations and revert to rescanning the complete set of channels for a number of scan iterations.

Adaptive Scan Mechanism Weighted Scan

Figure 5:
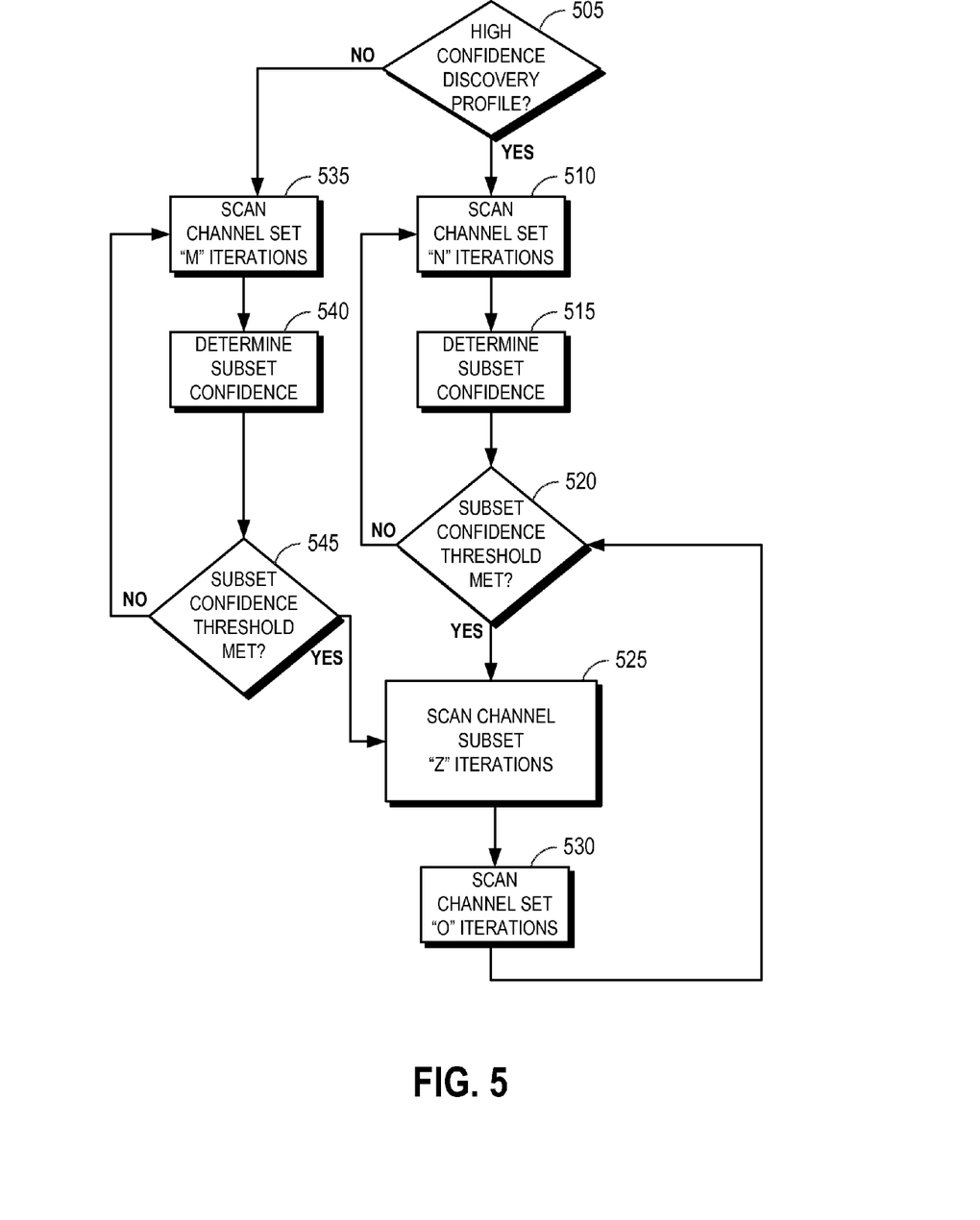
FIG. 5 illustrates a flow diagram of Adaptive Scan Mechanism Weighted Scan, in one embodiment.

FIG. 5 illustrates one embodiment of an ASM Weighted Scan. At block 505, the ASM can check the Discovery Profile for deterministic or high confidence indicators. For example, the ASM can check the scan pattern recorded in the Discovery Profile to decide whether it is likely that a majority of nearby WAPs are broadcasting on non-overlapping channels. Also, a geographic location (e.g., country of origin for the WAPs) associated with the Discovery Profile may be deterministic in deciding whether to narrow the possible non-overlapping subset to the non-overlapping channels associated with the particular country.

At block 510, the ASM determines the Discovery Profile contains one or more deterministic indicators or has a high confidence in a Subset Profile and scans all channels for "N" iterations. For example, the ASM may have determined with a high confidence that nearby WAPs are communicating predominantly over a defined subset of non-overlapping channels (e.g., U.S. non-overlapping channels 1, 6, and 11), and begins scanning all channels for "N" iterations.

At block 515, the ASM can determine a subset confidence after the scanning "N" iterations. In one embodiment, the subset confidence determines whether the ASM should rescan all channels again for "N" iterations, or whether the confidence is high enough to limit future scans to a subset of channels. In one embodiment, the ASM determines subset confidence by determining if a test ratio of all scanned channels divided by the discovered non-overlapping channels is greater than or equal to a predetermined acceptable limit of non-overlapping discovered channels. The subset confidence may be a separate determination from Discovery Profile confidence determined at block 505. For example, a high Discovery Profile confidence is achieved if a country indicator is present in a frame, or if a scan pattern is deterministic.

At block 520, the ASM can determine if a subset confidence threshold is met. In one embodiment, the confidence threshold is met if the test ratio (e.g., the test ratio disclosed above) is greater than or equal to the predetermined acceptable limit and the confidence threshold is not met if the ratio is less than the predetermined acceptable limit. If the threshold is not met, all channels are rescanned for "N" iterations at block 510. If the threshold is met, the ASM continues to block 525 to scan a subset of channels for "Z" iterations as disclosed in greater detail below.

If, at block 505, the Discovery Profile contains non-deterministic or low confidence indicators, the ASM, at block 535, scans all channels "M" iterations. In one embodiment, "M" is a greater number of scan iterations than "N." For example, the ASM may have a low confidence that nearby WAPs broadcast on a limited subset of non-overlapping channels (e.g., channels other than 1, 6, and 11 in the United States).

At block 540, the ASM can determine a subset confidence upon scanning the "M" iterations. In one embodiment, the ASM determines subset confidence by the test ratio disclosed above in relation to block 520. The ASM can determine if a subset confidence threshold is met at block 545. If the ratio is less than the predetermined acceptable limit, the confidence threshold may not be met, and all channels are rescanned for "M" iterations at block 535.

If the test ratio is greater than or equal to the predetermined acceptable limit (e.g., as disclosed above), the confidence threshold is met and the ASM continues to block 525 to scan a subset of channels for "Z" iterations. In one embodiment, the subset of channels is determined by the Subset Profile, and the particular Subset Profile is chosen based on an initial match to the Discovery Profile as disclosed above.

In one embodiment, the number of "Z" iterations may depend on the movement of the mobile station. For example, when the mobile station moves out of range of known/discovered WAPs into an unknown/undiscovered set of WAPs, the previously scanned channels may no longer be relevant to the environment of the mobile station and the Discovery Profile may be updated. In one embodiment, the mobile station can set or adjust "Z" based on passage of time, number of new discovered WAPs, or actual distance traveled by the mobile station.

At block 530, the ASM, upon determining that the scanning of the subset for "Z" iterations (i.e., subset scan iterations) is complete, can scan all channels (e.g., the superset of channels) for "O" iterations. In one embodiment "O" is a numerical value less than complete channel set scan iteration values "M" and "N" described above. The ASM can determine a confidence in the subset of channels based on channels discovered in the "O" iterations. In one embodiment, if the confidence is high (e.g., only or mostly non-overlapping channels were discovered or the test ratio greater than equal to the limit), the ASM can return to scanning a subset of channels (e.g., indicated by the Subset Profile). Alternatively, if the confidence is low (e.g., one or more overlapping channels were discovered or the test ratio less than the limit), the ASM can rescan all channels for "N" iterations and assess the confidence again before limiting rescanning to the subset of channels.

Persons of skill in the art will recognize that the scan iteration variables described above ("N," "M," "O," and "Z") can be predetermined values to provide the best performance of the mobile station. In some embodiments, the scan iterations of the complete scan of all channels ("N," "M," and "Z") can be adjusted down (e.g., less scan iterations) for greater power savings, or adjusted up (e.g., more scan iterations) when discovering every channel is important. In some embodiments, the "O" scan iterations of the subset scan can be adjusted up (e.g., more scan iterations) for greater power savings, or adjusted down (e.g., less scan iterations) when discovering every channel is important.

In one embodiment, the ASM can continue to iterate through scanning all channels and scanning a subset of non-overlapping channels until receiving an exit trigger or command. As described above, ASM can be used in mobile station positioning as well as for WAP data or establishing network connections, although persons skilled in the art will recognize the embodiments described herein are not limited to these embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A computer-implemented method for wireless access point discovery at a mobile device, the method comprising:
    scanning, at the mobile device, a set of channels in a first scan iteration to discover one or more wireless access points;
    generating, at the mobile device, a discovery profile based on one or more discovered wireless access points, wherein generating the discovery profile comprises
        extracting a country identifier from a signal received from a wireless access point of the one or more discovered wireless access points, and
        selecting a subset of the set of channels by matching one or more channels from the discovery profile to one or more channels of a profile of a plurality of profiles and by matching the country identifier to a geographical area associated with the profile, each profile being associated with a geographical area and comprising a non-overlapping subset of the set of channels; and
    performing, at a mobile device, a scan limited to the selected subset of the set of channels in a second scan iteration.

2. The method of claim 1, further comprising:
    performing a rescan limited to the subset in a plurality of subsequent scan iterations until a subset scan iteration threshold is met.

3. The method of claim 2, further comprising:
    determining the subset scan iteration threshold is met; and
    rescanning the set of channels in a plurality of subsequent scan iterations until a first set scan iteration threshold is met.

4. The method of claim 3, further comprising:
    determining the first set scan iteration threshold is met;
    calculating a low confidence in the subset; and
    rescanning, based on the low confidence, the set of channels in a plurality of subsequent scan iterations until a second set scan iteration threshold is met, wherein the second set scan iteration threshold has more scan iterations than the first set scan iteration threshold.

5. A non-transitory machine readable storage medium containing executable code for wireless access point discovery at a mobile device, which, when executed by a processor, cause the processor to:
    scan, at the mobile device, a set of channels in a first scan iteration to discover one or more wireless access points;

generate, at the mobile device, a discovery profile based on one or more discovered wireless access points, wherein the code to cause the processor to generate the discovery profile comprises code to cause the processor to extract a country identifier from a signal received from a wireless access point of the one or more discovered wireless access points, and select a subset of the set of channels by matching one or more channels from the discovery profile to one or more channels of a profile of a plurality of profiles and by matching the country identifier to a geographical area associated with the profile, each profile being associated with a geographical area and comprising a non-overlapping subset of the set of channels; and perform, at the mobile device, a scan limited to the selected subset of the set of channels in a second scan iteration.

6. The machine readable storage medium of claim 5, further comprising code to:

perform a rescan limited to the subset of channels in a plurality of subsequent scan iterations until a subset scan iteration threshold is met.

7. The machine readable storage medium of claim 6, further comprising code to:

determine the subset scan iteration threshold is met; and rescan the set of channels in a plurality of subsequent scan iterations until a first set scan iteration threshold is met.

8. The machine readable storage medium of claim 7, further comprising code to:

determine the first set scan iteration threshold is met;

calculate a low confidence in the subset of the set of channels; and rescan, based on the low confidence, the set of channels in a plurality of subsequent scan iterations until a second set scan iteration threshold is met, wherein the second set scan iteration threshold has more scan iterations than the first set scan iteration threshold.

9. A data processing device comprising:

a processor; and a storage device coupled to the processor, the storage device storing instructions for wireless access point discovery, which, when executed by the processor cause the processor to:

scan a set of channels in a first scan iteration to discover one or more wireless access points;

generate a discovery profile based on one or more discovered wireless access points, wherein the instructions to cause the processor to generate the discovery profile further comprise instructions configured to cause the processor to extract a country identifier from a signal received from a wireless access point of the one or more discovered wireless access points, and select a subset of the set of channels by matching one or more channels from the discovery profile to one or more channels of a profile of a plurality of profiles and by matching the country identifier to a geographical area associated with the profile, each profile being associated with a geographical area and comprising a non-overlapping subset of the set of channels; and perform a scan limited to the selected subset of the set of channels in a second scan iteration.

10. The data processing device of claim 9, further comprising instructions to cause the processor to:

perform a rescan limited to the subset of channels in a plurality of subsequent scan iterations until a subset scan iteration threshold is met.

11. The data processing device of claim 10, further comprising instructions to cause the processor to:

determine the subset scan iteration threshold is met; and rescan the set of channels in a plurality of subsequent scan iterations until a first set scan iteration threshold is met.

12. The data processing device of claim 11, further comprising instructions to cause the processor to:

determine the first set scan iteration threshold is met;

calculate a low confidence in the subset of the set of channels; and rescan, based on the low confidence, the set of channels in a plurality of subsequent scan iterations until a second set scan iteration threshold is met, wherein the second set scan iteration threshold has more scan iterations than the first set scan iteration threshold.

13. An apparatus for wireless access point discovery comprising:

means for scanning a set of channels in a first scan iteration to discover one or more wireless access points;

means for generating a discovery profile based on one or more discovered wireless access points, wherein the means for generating the discovery profile comprise means for extracting a country identifier from a signal received from a wireless access point of the one or more discovered wireless access points, and means for selecting a subset of the set of channels by matching one or more channels from the discovery profile to one or more channels of a profile of a plurality of profiles and by matching the country identifier to a geographical area associated with the profile, each profile being associated with a geographical area and comprising a non-overlapping subset of the set of channels; and means for performing a scan limited to the selected subset of the set of channels in a second scan iteration.

14. The apparatus of claim 13, further comprising:

means for performing a rescan limited to the subset of channels in a plurality of subsequent scan iterations until a subset scan iteration threshold is met.

15. The apparatus of claim 14, further comprising:

means for determining the subset scan iteration threshold is met; and rescanning the set of channels in a plurality of subsequent scan iterations until a first set scan iteration threshold is met.

16. The apparatus of claim 15, further comprising:

means for determining the first set scan iteration threshold is met;

means for calculating a low confidence in the subset of the set of channels; and means for rescanning, based on the low confidence, the set of channels in a plurality of subsequent scan iterations until a second set scan iteration threshold is met, wherein the second set scan iteration threshold has more scan iterations than the first set scan iteration threshold.

17. A computer-implemented method for wireless access point discovery at a mobile device, the method comprising:

scanning, at the mobile device, a set of channels in a first scan iteration to discover one or more wireless access points;

generating, at the mobile device, a discovery profile based on one or more discovered wireless access points;

performing, at a mobile device, a scan limited to a subset of the set of channels in a second scan iteration, wherein the subset of the set of channels consists of non-overlapping channels selected according to the discovery profile; and performing a rescan limited to the subset in a plurality of subsequent scan iterations until a subset scan iteration threshold is met, wherein performing the rescan comprises determining a confidence level associated with the discovery profile, determining a scan iteration threshold based on the confidence level, and rescanning the set of channels in a plurality of subsequent scan iterations until the scan iteration threshold is met.

* * * * *